(12) United States Patent
Liu et al.

(10) Patent No.: US 10,061,837 B2
(45) Date of Patent: Aug. 28, 2018

(54) METHOD AND SYSTEM FOR PROCESSING RECOMMENDED TARGET SOFTWARE

(71) Applicant: TENCENT TECHNOLOGY (SHENZHEN) COMPANY LIMITED, Shenzhen (CN)

(72) Inventors: Xin Liu, Shenzhen (CN); Xin Tuo, Shenzhen (CN); Zhemin Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 845 days.

(21) Appl. No.: 14/576,788

(22) Filed: Dec. 19, 2014

(65) Prior Publication Data

US 2015/0120742 A1    Apr. 30, 2015

Related U.S. Application Data

(63) Continuation of application No. PCT/CN2013/077577, filed on Jun. 20, 2013.

(30) Foreign Application Priority Data

Jun. 21, 2012    (CN) .......................... 2012 1 0207154

(51) Int. Cl.
*G06F 7/00*    (2006.01)
*G06F 17/30*    (2006.01)
(Continued)

(52) U.S. Cl.
CPC .... *G06F 17/30598* (2013.01); *G06F 17/3053* (2013.01); *G06F 17/30486* (2013.01); *G06Q 30/02* (2013.01); *G06Q 30/0631* (2013.01)

(58) Field of Classification Search
USPC ................................................. 707/737, 767
See application file for complete search history.

(56) References Cited

U.S. PATENT DOCUMENTS 7,158,986 B1 *  1/2007  Oliver ............... G06F 17/30702
7,743,059 B2 *  6/2010  Chan ................. G06F 17/30867
                                                        705/26.7
(Continued)

FOREIGN PATENT DOCUMENTS

CN    101867594 A    10/2010
CN    101887390 A    11/2010
(Continued)

OTHER PUBLICATIONS

International Search Report for International Application No. PCT/CN2013/077577, dated Sep. 26, 2013.
(Continued)

*Primary Examiner* — Cheyne D Ly
(74) *Attorney, Agent, or Firm* — Knobbe Martens Olson & Bear LLP

(57) ABSTRACT

A method and a system for processing recommended software are disclosed. A cluster analysis module performs a cluster analysis for users based on software using information reported by the users, and determines a software list corresponding to each user cluster, and sort software in the software list according to using condition of the software. A recommendation module determines a user cluster that is the most relevant to a specific user based on software using information of the specific user, and selects top N pieces of software from a software list corresponding to the user cluster to recommend the selected top N pieces of software to the specific user, where N is a predefined value.

19 Claims, 8 Drawing Sheets

(51) Int. Cl.
*G06Q 30/02* (2012.01)
*G06Q 30/06* (2012.01)

(56) References Cited

U.S. PATENT DOCUMENTS

| | | | |
|---|---|---|---|
| 9,058,612 B2* | 6/2015 | Ben-Itzhak | G06Q 30/02 |
| 2008/0243637 A1* | 10/2008 | Chan | G06Q 30/02 |
| | | | 705/26.1 |
| 2009/0271356 A1 | 10/2009 | Jeong et al. | |
| 2011/0319053 A1 | 12/2011 | Jeong et al. | |
| 2013/0085886 A1* | 4/2013 | Satish | G06Q 30/02 |
| | | | 705/26.7 |
| 2014/0244762 A1* | 8/2014 | Wyndowe | H04L 67/10 |
| | | | 709/205 |

FOREIGN PATENT DOCUMENTS

| | | |
|---|---|---|
| CN | 101937547 A | 1/2011 |
| CN | 102104688 A | 6/2011 |
| EP | 1 722 543 A2 | 11/2006 |

OTHER PUBLICATIONS

Office Action issued in Chinese Patent Application No. 2012102071549 dated Sep. 18, 2016 in 11 pages.
International Preliminary Report on Patentability issued in International Application No. PCT/CN2013/077577 dated Dec. 31, 2014, in 12 pages.

* cited by examiner

METHOD AND SYSTEM FOR PROCESSING RECOMMENDED TARGET SOFTWARE

CROSS REFERENCE TO RELATED APPLICATIONS

This application is a continuation application of PCT Patent Application No. PCT/CN2013/077577, entitled "Method and System for Processing Recommended Target Software" filed on Jun. 20, 2013, which claims priority of Chinese Patent Application No. 201210207154.9, entitled "Method and System for Processing Recommended Target Software" filed on Jun. 21, 2012, both of which are incorporated by reference in their entirety.

TECHNICAL FIELD

The present application relates to software processing technologies of data processing devices, and especially to a method and system for processing recommended target software.

BACKGROUND

Nowadays, with increasing popularity of data processing devices such as computers, intelligent mobile phones, palm PCs, tablet PCs, etc., all kinds of software that runs on the data processing devices are booming.

In these data processing devices, a main technical solution for managing software is using a software management system. A software management system is software that manages software on a data processing device. In the industry, currently commonly used software managers for example are 360 software steward, Kingsoft software steward, etc. Currently, the software managers mainly have functions of: software repository, software upgrade, software uninstallation, download management, etc.

Usually, a software repository in a software management system integrates most of excellent commonly used software in the industry for users to select to install and upgrade. To provide users with more abundant and more comprehensive software installation and upgrade, currently a software repository supports more and more software, covering various categories such as instant messaging, audio-video playing, webpage browsing, input method, etc., and the total number of the software is up to thousands and even to tens of thousands. Among so much software, the quality of the software may be good or bad. For a user, he tends to hope that a software management system can recommend software with a high quality and more targeted for him. Therefore, currently most of the software management systems are integrated with a function of software recommendation.

In traditional art, a software management system recommends software based on the number of times of being downloaded or hotness of the software and software that has been installed. A way or channel of recommendation may include: pushing hot target software by using a rank list in a software repository, a recommendation page of special topics in a software repository, a tooltip, etc.

However, for existing solutions of recommending target software, relevance between recommended software and a specific user is low, which results in that recommendation may not be that accurate, and target software that meets usage features of a user may not be accurately recommended.

SUMMARY

In view of this, a method and a system for processing recommended software are disclosed to improve relevancy between recommended target software and a specific user, and improve accuracy of recommendation.

The technical solution is implemented as follows.

A method for processing recommended target software includes:

performing a cluster analysis for users based on software using information reported by the users, determining a software list corresponding to each user cluster, and sorting software in the software list according to using condition of the software; and determining a user cluster that is the most relevant to a specific user based on software using information of the specific user; and selecting top N pieces of software from a software list corresponding to the user cluster to recommend the selected top N pieces of software to the specific user, where N is a predefined value.

A system for processing recommended software, comprising a server, wherein the server includes:

memory;

one or more processors; and one or more programs stored in the memory and configured for execution by the one or more processors, the one or more programs comprising instructions to:

perform a cluster analysis for at least one user of at least one user client device based on software using information reported by the at least one user client device to determine a software list corresponding to each user cluster;

sort software in the software list according to using condition of the software;

determine a user cluster that is the most relevant to a specific user based on software using information of the specific user; and select top N pieces of software from a software list corresponding to the user cluster to recommend the selected top N pieces of software to the specific user, where N is a predefined value.

A computer readable storage medium, storing one or more programs configured to be executed by a computer system, the one or more programs comprising instructions to:

perform a cluster analysis for at least one user of at least one user client device based on software using information reported by the at least one user client device to determine a software list corresponding to each user cluster;

sort software in the software list according to using condition of the software;

determine a user cluster that is the most relevant to a specific user based on software using information of the specific user; and select top N pieces of software from a software list corresponding to the user cluster to recommend the selected top N pieces of software to the specific user, where N is a predefined value.

In the present disclosure, software using information of users is fully considered, and based on this, a cluster analysis is performed for the users, different software lists are recommended to different user clusters; during use of a specific user, a user cluster (equivalent to the using feature type of a user) to which the specific user belongs is determined, and software that is in the front rank of a software list corresponding to the specific user is recommended. In this way, the recommended target software according to the present disclosure may have a high relevancy with the specific user, and the accuracy of recommendation is relatively high.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

FIG. 5b is a schematic diagram illustrating an interface of showing the recommended target software by an icon after the recommended target software is clicked on;

DETAILED DESCRIPTION

The present disclosure will be further described in detail hereafter in combination with the accompanying drawings and detailed embodiments.

Figure 1:
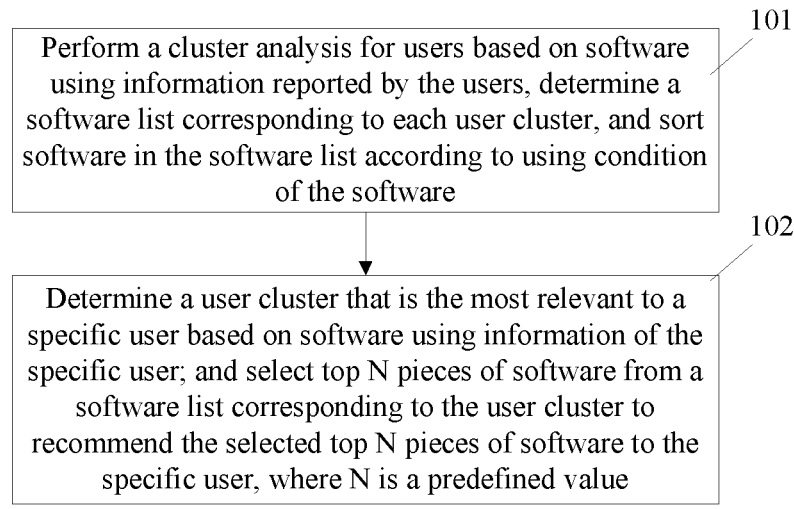
FIG. 1 is a schematic diagram illustrating a flow of a method for processing recommended target software according to an embodiment of the present disclosure.

FIG. 1 is a schematic diagram illustrating a flow of a method for processing recommended target software according to the present disclosure. Referring to FIG. 1, the method mainly includes the following process.

At block 101, a cluster analysis is performed for users based on software using information reported by the users, a software list corresponding to each user cluster is determined, and software in the software list is sorted according to using condition of the software.

At block 102, when a specific user uses a software management system, a user cluster that is the most relevant to the specific user is determined according to software using information of the specific user. From a software list corresponding to the user cluster, top N pieces of software is selected and is recommended to the specific user, where N is a predefined value.

Figure 2:
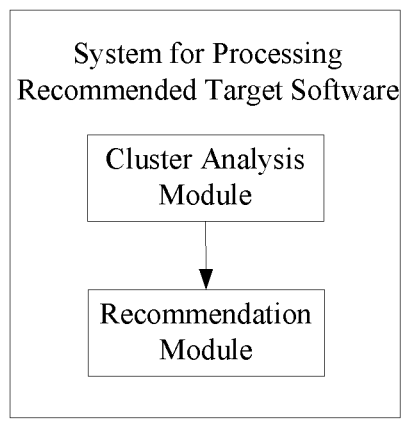
FIG. 2 is a schematic diagram illustrating a structure of a system for processing recommended target software according to an embodiment of the present disclosure.

FIG. 2 is a schematic diagram illustrating a structure of a system for processing recommended target software according to the present disclosure. The processing system is configured to implement the method according to the present disclosure. Referring to FIG. 2, the processing system includes a cluster analysis module and a recommendation module.

The cluster analysis module is configured to perform a cluster analysis for users based on software using information reported by the users, determine a software list corresponding to each user cluster, and sort software in the software list according to a using condition of the software.

The recommendation module is configured to determine a user cluster which is the most relevant to a specific user according to software using information of the specific user; and select top N pieces of software from a software list corresponding to the user cluster to recommend them to the specific user, where N is a predefined value.

At block 101, the software using information reported by the users refers to software using information that is reported by total users. The total users do not mean all users, but only sample users who upload their software using information. If the number of the sample users reaches a certain lower number limit (the lower number limit may be set according to requirements of an application), then it is determined that these sample users can represent all the users.

The sample users refer to users who have a right of reporting data. In a detailed embodiment of the present disclosure, a request of whether or not to agree to report client data is sent to every user of the software management system in advance, and if a user accepts the request, then the user turns into a sample user and has the right of reporting data; or if the user refuses the request, then the user does not has the right of reporting data.

Figure 3:
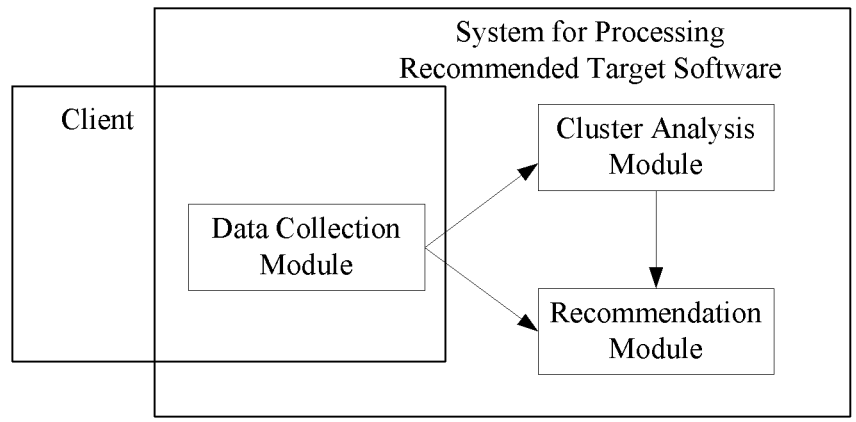
FIG. 3 is a schematic diagram illustrating another structure of the system for processing recommended target software according to an embodiment of the present disclosure.

To be able to collect software using information reported by users, in the processing system according to the present disclosure, a data collection module is included. As shown in FIG. 3, the data collection module is set on clients of the software management system, and is configured to collect software using information of the users who have the right of reporting data, and report the software using information to the cluster analysis module and the recommendation module.

The software using information reported by a user at block 101 includes: software information of software that has been installed on a user client device locally, e.g., information such as software names and/or software categories. The information may be obtained by the data collection module through searching according to information in regedit and in a configuration file on the client device, such as paths and executable files of software that has been installed.

The cluster analysis process at block 101 will be described in the following.

Cluster analysis is also called group analysis, which is a multi-level statistical analysis method that classifies sample data according to the principle of "things of one kind come together". The processing object of the cluster analysis is a great amount of sample data, which requires reasonable classification according to features of the sample data.

The cluster analysis process is a process that classifies the sample data into different clusters. Therefore, objects in a same cluster have a relatively large similarity, while objects in different clusters have a relatively large diversity. The object of the cluster analysis is to perform classification for the sample data based on the similarity.

In the present disclosure, based on the collected software using information of the total users, features of different user groups are obtained by performing the cluster analysis, users whose software using features are similar are clustered into a user cluster, and a typical feature of the users in the user cluster is extracted as a criterion for subsequent determination of a cluster to which a specific user belongs.

In the embodiments of the present disclosure, existing mature cluster analysis methods may be used, for example, hierarchical clustering, partition method, joining method, dynamic clustering, orderly prototype-based clustering, overlapping clustering, fuzzy clustering, etc.

The cluster analysis module of the present disclosure performs the cluster analysis for the user groups according to the software names and/or category information of the software in installed software lists, clusters the user groups into user groups (user clusters) having different software using features, and selects a software list corresponding to each user cluster.

The direct data basis of the cluster analysis module is categories of installed software reported by respective sample users. If a sample user only reports a software name, then a software category to which the software belongs can be inquired from the software depository according to the software name, and the software category is used as the direct data basis for the cluster analysis.

At block 101, the detailed cluster process of the cluster analysis module performing the cluster analysis for the users may vary slightly according to different recommendation requirements. For example, a process of performing the cluster analysis for the users based on the software using information reported by the users according to an embodiment may include the following process.

At block 111, the amount of respective kinds of installed software that is reported by respective sample users is counted.

At block 112, categories of software that has been installed the most by the respective sample users are determined.

At block 113, the sample users are partitioned by using the categories of the software that has been installed the most as similarity to obtain user clusters of different software using features.

For example, for n sample users a1~an, a category of software that is installed the most is video. If n is larger than a cluster threshold, then a video user cluster is partitioned. A software using feature of the video user cluster is: video software being installed the most.

As another example, for m sample users b1~bm, a category of software that is installed the most is game. If m is larger than a cluster threshold, then a game user cluster is partitioned. A software using feature of the game user cluster is: game software being installed the most.

At block 101, after the cluster analysis is performed for the users, a software list corresponding to each use cluster needs to be determined. The detailed process may be as follows. For a user cluster that is partitioned according to the cluster analysis, software of a category corresponding to it is selected from the software repository of the software management system to constitute a software list, and the software in the software list is sorted according to their software using condition. The amount of the software in the software to be recommended list is also controllable and may be set according to service requirements.

The software in the software list being sorted according to their software using condition mainly means that the software is sorted according to their overall running hotness. Specifically, the process may include the following process. The number of downloads of the respective software and the number of times of being started and the running time of the respective software on user client devices reported by sample users are collected. For each piece of software, the number of downloads, the number of times of being started, and the running time of the software are respectively multiplied by corresponding weights, and are then summed to obtain the overall running hotness of the software. And the overall running hotness of the software is taken as the using condition of the software. The software in the software list is sorted according to their overall running hotness.

For example, for the video user cluster, k pieces of video software A1~Ak are selected to constitute a corresponding software to be recommended list, and the k pieces of video software is sorted according to their overall running hotness.

For the game user cluster, 1 piece of game software B1~B1 is selected to constitute corresponding a corresponding software to be recommended list, and the 1 piece of game software is sorted according to its overall running hotness.

In the present embodiment, the cluster analysis module is set at the server side. The block 101 is executed by the server.

At the block 102, when a specific user uses the software management system, usually whether the specific user having a right of reporting data or not needs to be determined, and there are two situations.

The first situation is as follows. If the specific user has the right of reporting data, then the client of the specific user obtains software using information at the client device, and reports the software using information to the server. The server determines a user cluster that is the most relevant to the specific user according to the software using information reported by the user client, and selects top N pieces of software from a software list corresponding to the user cluster and sends them to the client of the specific user. The client of the specific user shows the top N pieces of software as recommended software. For example, icons of recommended software may be shown on a Qdesk, and light gray is used to identify the software being recommended software.

The software using information mainly includes information of software that has been installed and/or information of software that is frequently used on the client device. The information of the software that has been installed on the client device may be categories and/or names of the installed software, and it may be obtained by the data collection module through searching according to information in regedit and in a configuration file on the client device, such as paths and executable files of software that has been installed. The information of the software that is frequently used by the client device mainly includes categories and/or names of the software that is frequently used. The software that is frequently used generally is software on a quick launch bar, on a desk, and/or on a DOCK bar, and may be obtained by the data collection module through an application programming interface (API) corresponding to an operating system on the client device.

In addition, if the specific user has the right of reporting data, then the method further includes the following process. The client of the specific user sends the using information of the recommended software to the server, and the using information of the recommended software includes at least one piece of the following information: the number of installations of the software, time from starting the software to stopping the software, and the number of secondary start-ups after the software is installed. The information is mainly obtained by the data collection module by counting click operations of the specific user and length of running time. After the server receives the using information of the recommended software, it determines the recommendation hotness of the recommended software. A specific determination method may be respectively multiplying the number of installations of the software, the time from starting the software to stopping the software, and the number of secondary start-ups after the software is installed by weights, and summing them to obtain the recommendation hotness. Then the rank of the recommended software in a software list of a corresponding user cluster is adjusted according to the hotness of the recommended software. For recommended software whose recommendation hotness is larger than a specified threshold, the rank of it is raised, and for recommended software whose recommendation hotness is smaller than the specified threshold, the rank of it is lowered. By this kind of adjustment, a selection dimension of recommending software for users is further added, which further improves the relevancy between target software and users, and improves the accuracy of recommendation.

Figure 4A:
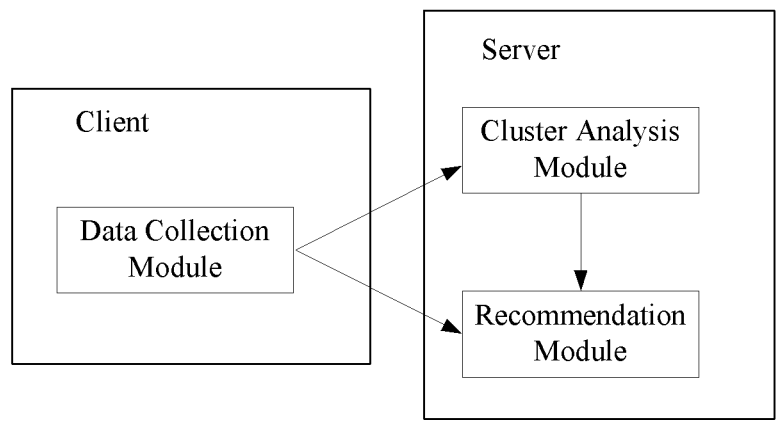
FIG. 4a is a schematic diagram illustrating a cluster analysis module and a recommendation module being set at a server.

In an embodiment of the system for processing recommended target software according to the present disclosure, to implement the method in the first situation, the cluster analysis module and the recommendation module need to be set at the server, as shown in FIG. 4a.

In the second situation, if the specific user has no right of reporting data, then the server sends information of each user cluster and a sorted software list corresponding to the user cluster to the client of the specific user. The client of the specific user obtains the software using information on the client device. The client of the specific user determines a user cluster which is the most relevant to the specific user according to the software using information on the client device, selects top N pieces of software in a software list corresponding to the user cluster, and shows them as recommended software.

Similar to that in the first situation, the software using information mainly includes information of software that has been installed on the client device and/or information of software that is frequently used by the client device. The information of the software that has been installed on the client device may be categories and/or names of the installed software, and it may be obtained by the data collection module through searching according to information in regedit and in a configuration file on the client device, such as paths and executable files of software that has been installed. The information of the software that is frequently used by the client device mainly includes categories and/or names of the software that is frequently used. The software that is frequently used generally is software on a quick launch bar, on a desk, and/or on a DOCK bar, and may be obtained by the data collection module through an API corresponding to an operating system on the client device.

Figure 4B:
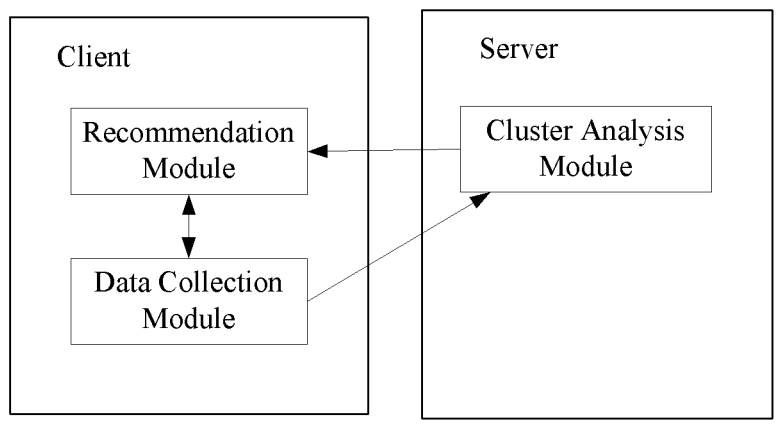
FIG. 4b is a schematic diagram illustrating the cluster analysis module being set at the server and the recommendation module being set at a client.

In an embodiment of the system for processing recommended target software according to the present disclosure, to implement the method in the second situation, the cluster analysis module needs to be set at the server, and the recommendation module needs to be set at the client, as shown in FIG. 4b. The cluster analysis module is further configured to send information of each user cluster and a sorted software list corresponding to each user cluster to the client. The recommendation module is further configured to obtain the software using information of the specific user on the client device from the data collection module on the client device, determine a user cluster which is the most relevant to the specific user according to the software using information of the specific user on the client device, select top N pieces of software in a software list corresponding to the user cluster, and show them as recommended software.

In an embodiment of the present invention, the software using information of the specific user in block 102 includes information of software that has been installed on the client device and/or information of software that is frequently started by the client device.

Determining the user cluster which is the most relevant to the user according to the software using information of the specific user specifically includes the following process.

At block 121, in a software list corresponding to each user cluster, a cluster relevancy degree between each piece of software and the user cluster is determined according to a rank of the software.

At block 122, according to software lists corresponding to respective user clusters and the cluster relevancy degrees of software in the software lists, user clusters to which the respective software that has been installed and/or the respective software that is frequently started on the user client device belongs are determined, and cluster relevancy degrees between the respective software that has been installed and/or the respective software that is frequently started and the user clusters to which they belong are determined.

At block 123, cluster relevancy degrees of software that belongs to a same user cluster are added together to obtain a matching score of the user cluster. The process here may further include the following process. A higher weight is allocated to a piece of software which is frequently started than that is allocated to a piece of software that has been installed, and the cluster relevance degrees of the software that belongs to the same user cluster are added together according to software weights, and a weighted sum is used as the matching score of the user cluster.

For example, if the software that has been installed by the user includes game software X, game software Y, and office software Z, then two relevant user clusters are found, namely, a user cluster of game and a user cluster of office. Then it is found that a relevancy degree of game software X in the user cluster of game is x, a relevancy degree of game software Y in the user cluster of game is y, and a relevancy degree of office software Z in the user cluster of office is z. Then a matching score of the user cluster of game is x+y, and a matching score of the user cluster of office is z.

At block 124, a user cluster which has the highest matching score is selected to be the user cluster which is the most relevant to the user.

After the user cluster which is the most relevant to the specific user is determined, e.g., the user cluster of game being determined to be the cluster which is the most relevant to the user, top N pieces of software in a software list corresponding to the user cluster of game is recommended to the specific user.

In another embodiment of the present disclosure, in step 102, selecting top N pieces of software from the software list corresponding to the user cluster may specifically include the following process. Software that has been installed by the specific user is removed from a list of software to be recommended of the user cluster, and top N pieces of software is selected from remaining software and is recommended to the specific user. In this way, the recommendation will not be interfered with by the software that has been installed by the user and the accuracy of the recommendation is further improved.

In a solution, the number of recommended software is N=1. That is, for a specific user, only one piece of software is recommended. In this way, difficulty in selection for the user caused by recommending too much software to the user at one time may be avoided.

It will be appreciated by those skilled in the art that the modules of the system in the above embodiments may be distributed in the apparatuses as described in the embodiments, or may be changed to be located in one or more apparatuses other than those in the embodiment. The modules in the embodiments may be integrated into one module, or may be further separated into multiple sub-modules.

In fact, the system for processing recommended target software according to the embodiments of the present disclosure may be implemented in various ways. For example, it may be compiled into a plug-in installed into a software management system in compliance with application interfaces of a certain standard, or may be encapsulated into an application for users to download and use. When it is compiled into a plug-in, it may be implemented by ocx, dll, cab, etc. Or the system for processing recommended target software proposed by the embodiments of the present disclosure may be implemented by specific technic such as a Flash plug-in, a RealPlay plug-in, a MMS plug-in, a MIDI stave plug-in, an ActiveX plug-in, etc.

Based on the technical solutions disclosed in the above respective embodiments, a computer readable storage medium is further disclosed here. The computer readable storage medium is configured to store instructions that enable a device to execute the method for processing recommended target software disclosed herein. Specifically, a system or apparatus provided with a storage medium may be provided, software program codes that implement functions of any of the above embodiments are stored on the storage medium, and a computer (or CPU or MPU) of the system or apparatus may read and execute the software program codes stored on the storage medium.

In this situation, since the program codes per se read from the storage medium may implement functions in any instance of the above embodiments, the program codes and the storage medium storing the program codes constitute a part of the mapping management technical solution.

Embodiments of the storage medium that stores the program codes include floppy disk, hard disk, magnetic disk, disc (e.g., CD-ROM, CD-R, CD-RW, DVD-ROM, DVD-RAM, DVD-RW, DVD+RW), magnetic tape, non-volatile memory and ROM. Alternatively, the program codes may be downloaded from a server computer via a communication network.

In addition, it should be understood that a part of or all actual operations may be carried out not only by executing the program codes read by a computer, but also by an operating system on a computer according to instructions based on program codes, so as to realize the functions of any of forgoing embodiments.

Figure 6A:
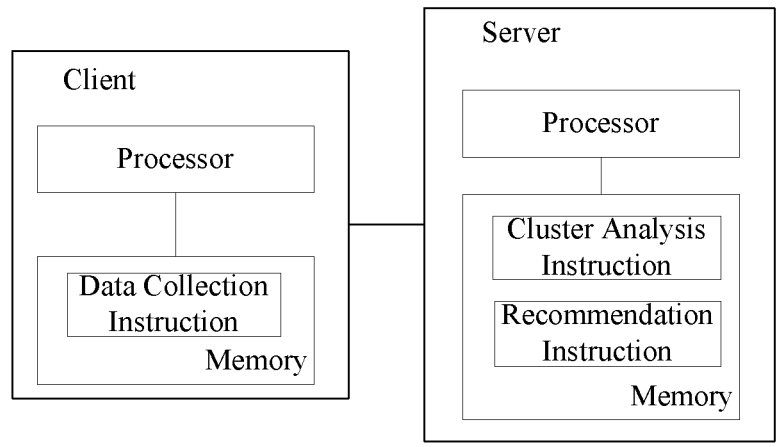
FIG. 6a is a schematic diagram illustrating another structure of the system for processing recommended target software according to an embodiment of the present disclosure.

For example, FIG. 6a is a schematic diagram illustrating another structure of the system for processing recommended target software according to an embodiment of the present disclosure. As shown in FIG. 6a, the system may include a server and a client. The server includes a first memory and a first processor that communicates with the first memory, in which the first memory stores a cluster analysis instruction and a recommendation instruction executable by the first processor.

The cluster analysis instruction is configured to instruct performing a cluster analysis for users based on software using information reported by clients of the users, determining a software list corresponding to each user cluster, and sorting software in the software list according to using condition of the software.

The recommendation instruction is configured to instructing determining a user cluster which is the most relevant to a specific user according to software using information of a client of the specific user; and selecting first N pieces of software from a software list corresponding to the user cluster and recommending them to the specific user, where N is a predefined value.

Accordingly, the client may include a second memory and a second processor that communicates with the second memory. The second memory stores data a collection instruction that is executable for the second processor and is configured to instruct collecting software using information of users who have a right of reporting data, and reporting data to the server.

Figure 6B:
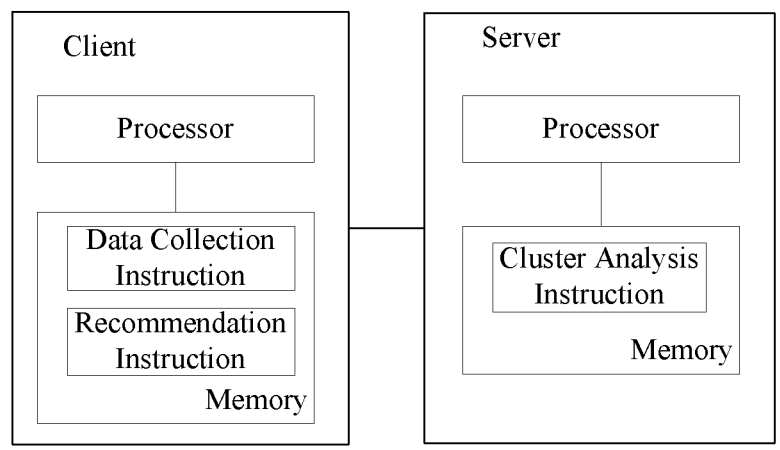
FIG. 6b is a schematic diagram illustrating another structure of the system for processing recommended target software according to an embodiment of the present disclosure.

FIG. 6b is a schematic diagram illustrating another structure of the system for processing recommended target software according to an embodiment of the present disclosure. As shown in FIG. 6b, the system may include a server and a client. The server includes a first memory and a first processor that communicates with the first memory, in which the first memory stores a cluster analysis instruction that is executable for the first processor.

The cluster analysis instruction is configured to instruct performing a cluster analysis for users based on software using information reported by clients of the user, determining a software list corresponding to each user cluster, sorting software in the software list according to using condition of the software, and sending information of each user cluster and a sorted software list corresponding to each user cluster to the client.

The client may include a second memory and a second processor that communicates with the second memory. The second memory stores a data collection instruction and a recommendation instruction that are executable for the second processor.

The data collection instruction is configured to instruct collecting software using information of users who have a right of reporting data, and reporting the software using information to the server; or instruct collecting software using information of users who have no a right of reporting data.

The recommendation instruction is configured to instruct obtaining software using information of a specific user on a client device by using data collection instruction on the client device, and instruct determining a user cluster that is the most relevant to the specific user according to the software using information of the client of the specific user; and selecting top N pieces of software from a software list corresponding to the user cluster and showing them as recommended software, where N is a predefined value.

As described in the above, the technical solution in the embodiments of the present disclosure may infer a user's preference for using software through a series of processes, and by using the technical solution to recommend software, accuracy of matching between software recommendation and user requirements may be improved, and some relatively outstanding but not well known software may be easily recommended to related users as well.

There may be many ways to show recommended target software on the client. For example, in an embodiment of the present disclosure, recommended target software is shown by way of icons, and by clicking to execute installation, the overall recommendation flow becomes relatively ethereal and smooth, which simplifies the flow to the largest extent and degrades a user's mental pressure.

Figure 5A:
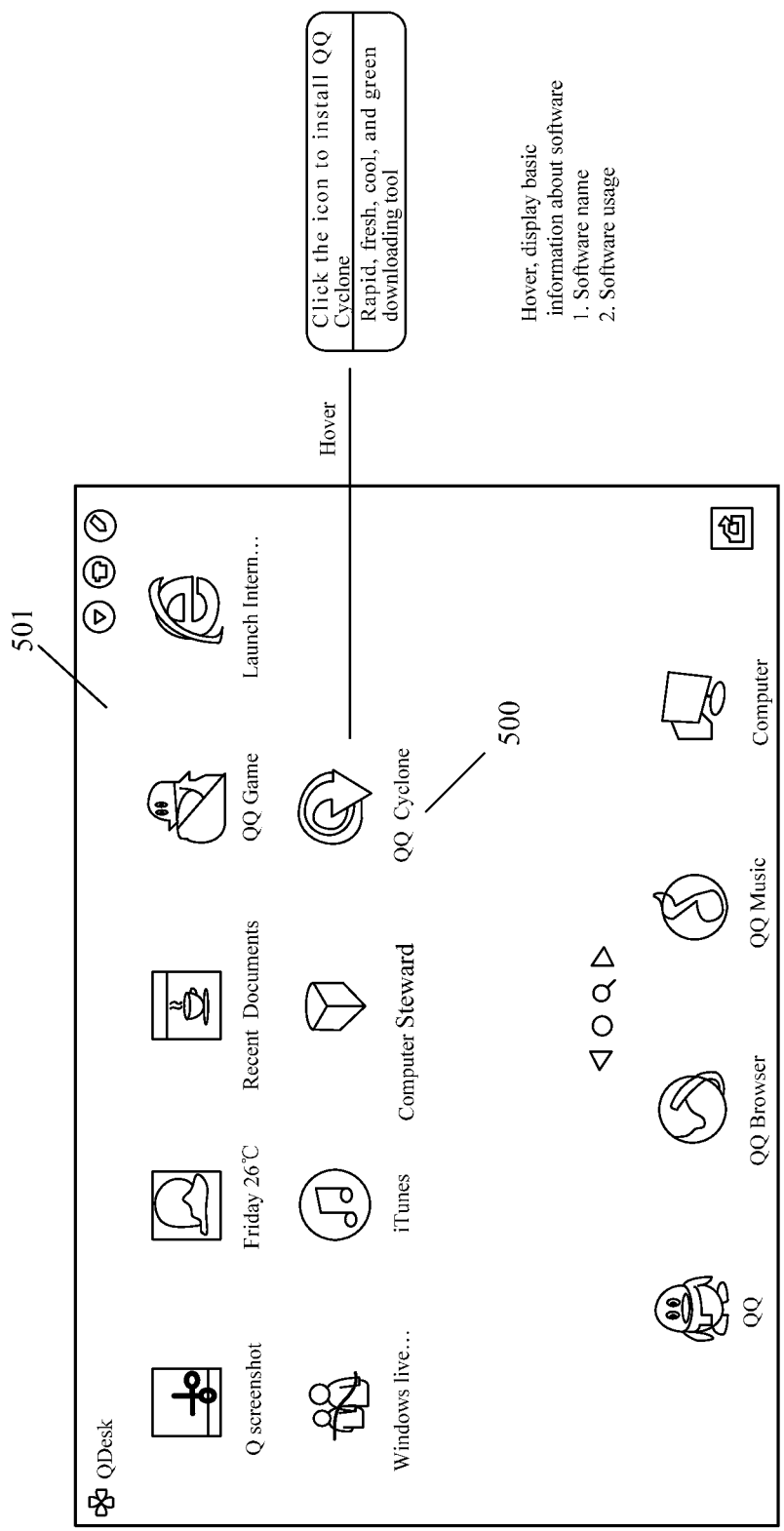
FIG. 5a is a schematic diagram illustrating an interface of showing recommended target software by an icon.

FIG. 5a is a schematic diagram illustrating an interface of showing recommended target software by way of icon. Referring to FIG. 5a, recommended software may be shown by an icon different from other icons, e.g., by a light gray icon 500 (other icons are in deep color) in an operation panel of a software management system, e.g., an ethereal software start-up operation panel named "Qdesk"; a frequency at which the target software is pushed may be configured at backstage, e.g., a basic frequency being one piece of software one week.

Figure 5B:
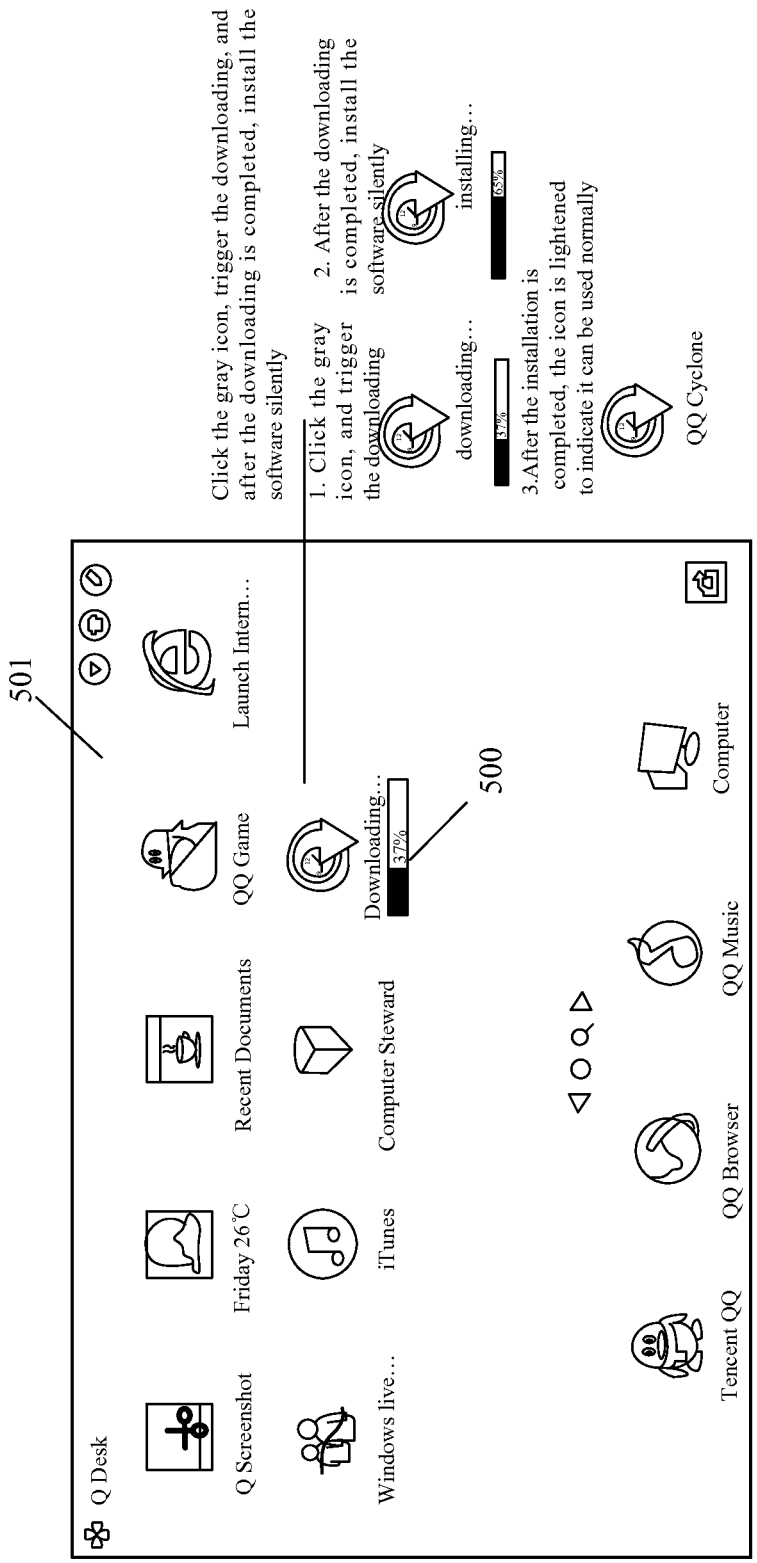

FIG. 5b is a schematic diagram illustrating an interface of showing the recommended target software by an icon after the recommended target software is clicked on. Referring to FIG. 5b, when the light gray icon 500 is clicked on, a download and installation procedure is triggered; after the download is completed, the software is silently installed; after the installation is completed, the icon is lightened (i.e., removing the light gray), which indicates that the software can be normally used.

Figure 5C:
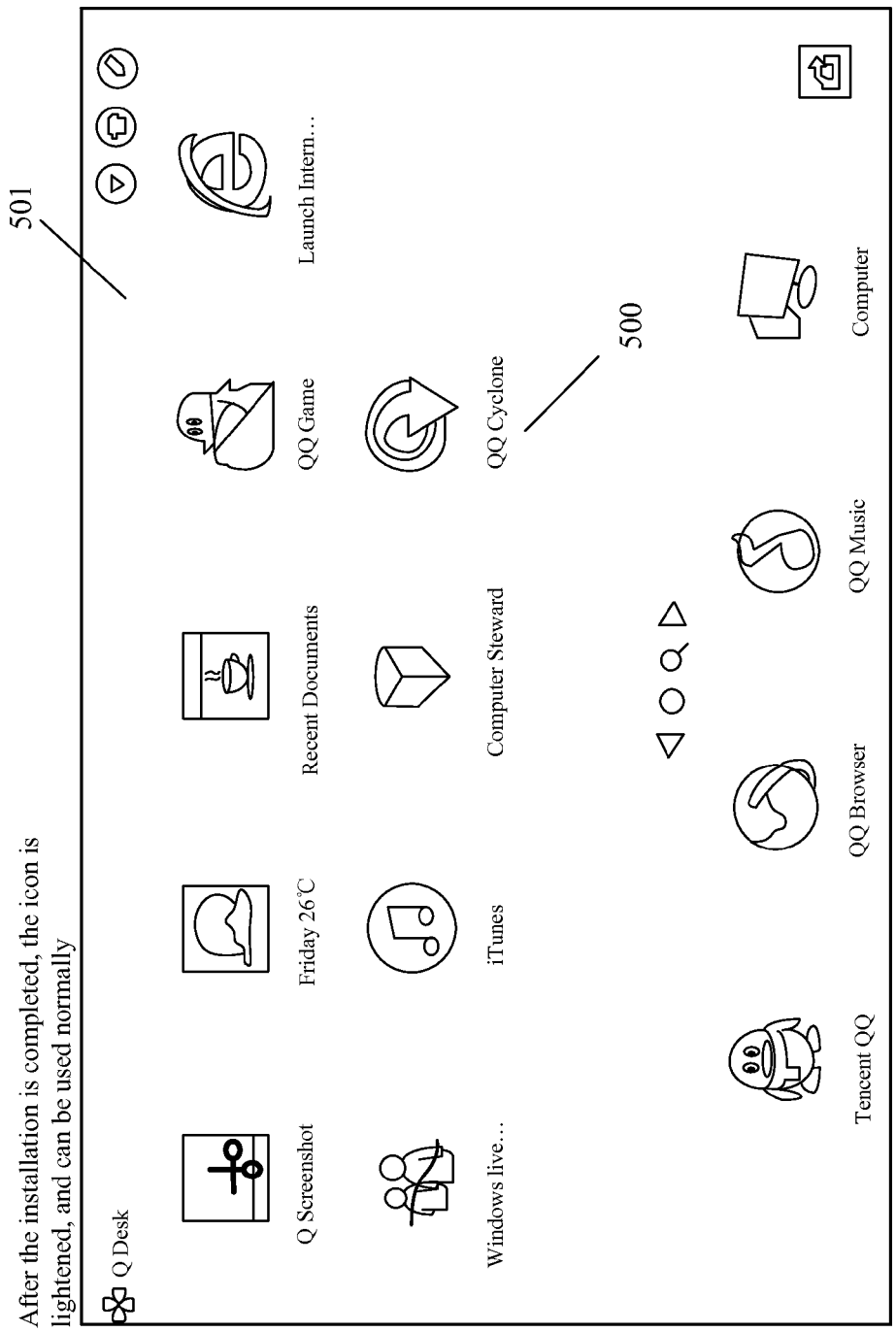
FIG. 5c is a schematic diagram illustrating an interface of showing the recommended target software by an icon after the recommended target software is downloaded and installed.

FIG. 5c is a schematic diagram illustrating an interface of showing the recommended target software by an icon after the recommended target software is downloaded and installed. As shown in FIG. 5c, after the installation is completed, the software icon 500 is lightened, which can be used as other icons in the "Qdesk" panel.

Figure 5D:
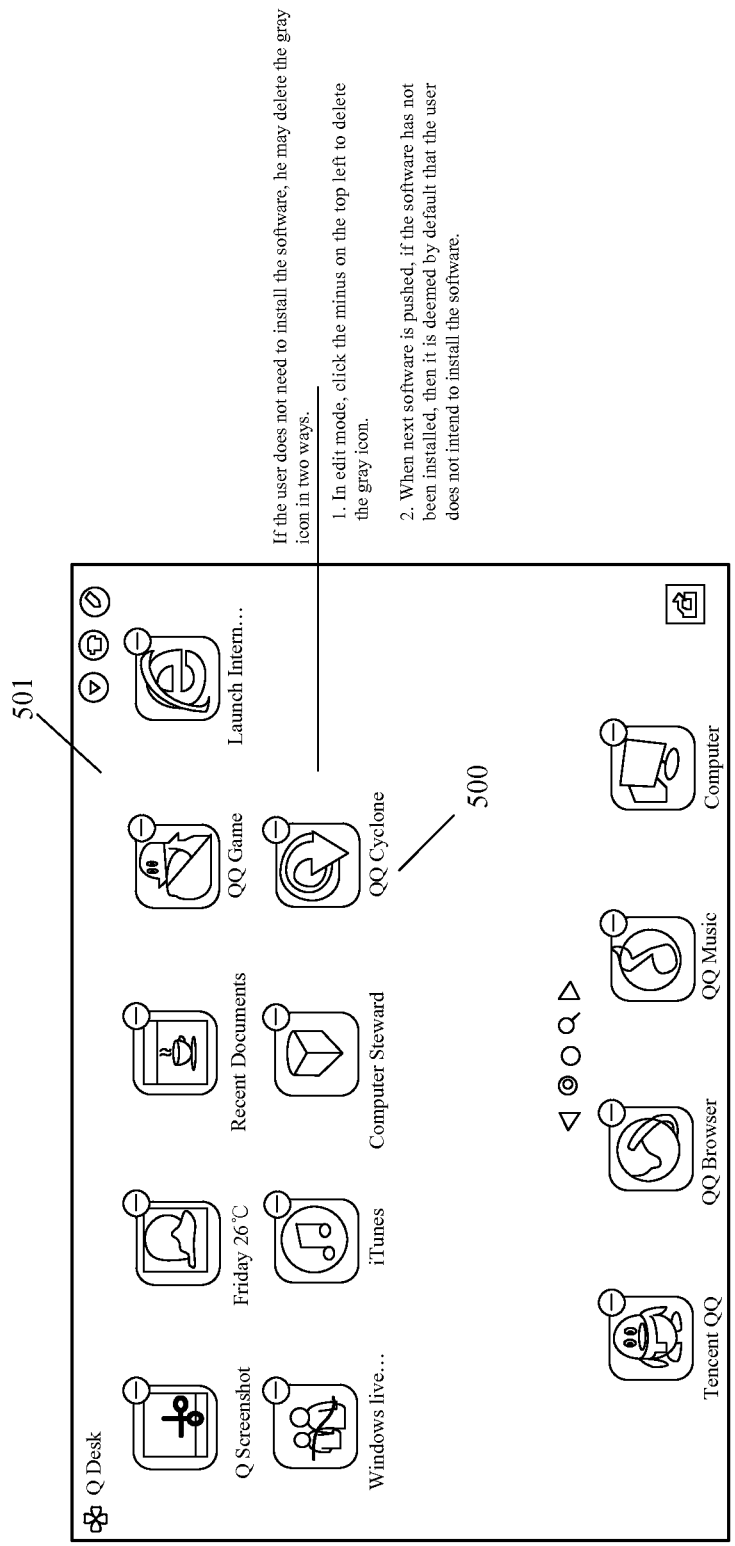
FIG. 5d is a schematic diagram illustrating an interface of showing edit mode of recommended target software by an icon.

If the user does not click on the light gray icon 500, then the light icon 500 may be removed in two ways as follows:

1) Common deletion operation: after edit mode is entered, a minus on the top right is clicked on to delete the light gray icon. FIG. 5d is a schematic diagram illustrating an interface of showing edit mode of recommended target software by an icon.

2) When next software is pushed, if it is detected that the previous light gray icon has not been installed yet, the original icon is replaced automatically.

False situations may be dealt with in the following ways.

If a network is not connected normally, a floating window will pop up to prompt "network connection is abnormal, download fails", and when the user clicks on the light gray icon 500 again, downloading the target software is re-triggered.

If after the target software is downloaded, the installation of it fails, then the light gray icon 500 is kept to be light gray; and a flowing window pops up to prompt "installation fails, please try again", and when the user clicks on the light icon again, silent installation is re-triggered.

As shown in the FIG. 5a to FIG. 5d, when software products are recommended in this kind of icon management software panel, it more meets the expectation of users. In this way, the utility of software may be fulfilled, and the feature of software recommendation may be expanded based on icon management.

It should be understood that the foregoing is only embodiments of the present disclosure and is not intended to limit the present disclosure. Any modification, equivalent substitution, and improvement without departing from the spirit and principle of this disclosure should be covered in the protection scope of the disclosure.

What is claimed is:

1. A method for processing recommended target software, comprising:
    performing a cluster analysis for at least one user of at least one user client device based on software using information reported by the at least one user client device to determine a software list corresponding to each user cluster, and sorting software in the software list according to using condition of the software; and
    determining a user cluster that is the most relevant to a specific user based on software using information of the specific user; and selecting top N pieces of software from a software list corresponding to the user cluster to recommend the selected top N pieces of software to the specific user, where N is a predefined value;
    wherein the software using information of the specific user comprises: information of software that has been installed and/or information of software that is frequently started on a client device of the specific user; and
    determining the user cluster that is the most relevant to the specific user based on the software using information of the specific user comprises:
    in a software list corresponding to each user cluster, determining a cluster relevancy degree between each piece of software and the user cluster according to a rank of the software;
    determining user clusters to which the respective software that has been installed and/or the respective software that is frequently started on the client device of the specific user belongs according to software lists corresponding to respective user clusters and cluster relevancy degrees of software in the software lists, and determining cluster relevancy degrees between the respective software that has been installed and/or the respective software that is frequently started and the user clusters to which they belong;
    adding cluster relevancy degrees of software that belongs to a same user cluster to obtain a matching score of the user cluster; and
    selecting a user cluster that has a highest matching score to be the user cluster that is the most relevant to the user.

2. The method according to claim 1, wherein the software using information reported by the at least one user client device comprises: software information of software that has been installed on the at least one user client device; and
    performing the cluster analysis for the at least one user of the at least one user client device based on the software using information reported by the at least one user client device comprises:
    counting the amount of respective categories of installed software that is reported by respective sample users;
    determining categories of software that has been installed the most by the respective sample users; and
    performing cluster partition for the sample users by using the categories of the software that has been installed the most as similarity to obtain user clusters of different software using features.

3. The method according to claim 1, wherein sorting the software in the software list according to the using condition of the software comprises:
    collecting the number of downloads of the respective software and the number of times of being started and running time of the respective software on the at least one user client device;
    for each piece of software, respectively multiplying the number of downloads, the number of times of being started, and running time of the software by corresponding weights, and making a sum to obtain overall running information of the software, the overall running information of the software being the using condition of the software; and
    sorting the software in the software list according to overall running information of the software.

4. The method according to claim 1, wherein adding the cluster relevancy degrees of the software that belongs to the same user cluster to obtain the matching score of the user cluster comprises:
    allocating a higher weight to a piece of software that is frequently started than a weight allocated to a piece of software that has been installed, adding the cluster relevance degrees of the software that belongs to the same user cluster according to software weights, and using a weighted sum as the matching score of the user cluster.

5. The method according to claim 1, wherein performing the cluster analysis for the at least one user of the at least one user client device based on the software using information reported by the at least one user client device to determine the software list corresponding to each user cluster, and sorting the software in the software list according to the using condition of the software are executed by a server;

the specific user is a user who has a right of reporting data; and determining the user cluster that is the most relevant to the specific user based on the software using information of the specific user, and selecting the top N pieces of software from the software list corresponding to the user cluster to recommend the selected top N pieces of software to the specific user, comprise:

a client device of the specific user obtaining the software using information and uploading the software using information to the server;

the server determining the user cluster that is the most relevant to the specific user based on the software using information reported by the client device of the specific user, sending the top N pieces of software selected from the software list corresponding to the user cluster to the client device of the specific user; and the client device of the specific user showing the top N pieces of software as recommended software.

6. The method according to claim 5, wherein after the client device of the specific user showing the top N pieces of software as the recommended software, the method further comprises:

the client device of the specific user sending using information of the recommended software to the server;

the server determining recommendation information of the recommended software according to the using information of the recommended software;

adjusting ranks of the recommended software in the software list corresponding to the user cluster according to the recommendation information of the recommended software, raising a rank of recommended software whose recommendation information is larger than a specific threshold, and lowering a rank of recommended software whose recommendation information is smaller than the specific threshold.

7. The method according to claim 6, wherein the using information of the recommended software comprises at least one of: the number of installations of the software, time from starting the software to ending the software, and the number of secondary start-ups after the software is installed.

8. The method according to claim 1, wherein performing the cluster analysis for the at least one user of the at least one user client device based on the software using information reported by the at least one user client device to determine the software list corresponding to each user cluster, and sorting the software in the software list according to the using condition of the software are executed by a server;

the specific user is a user who has no right of reporting data;

determining the user cluster that is the most relevant to the specific user based on the software using information of the specific user, and selecting the top N pieces of software from the software list corresponding to the user cluster to recommend the selected top N pieces of software to the specific user comprise:

the server sending information of each user cluster and a sorted software list corresponding to each user cluster to a client device of the specific user;

the client device of the specific user obtaining software using information on the client device; and the client device of the specific user determining the user cluster that is the most relevant to the specific user according to the software using information on the client device, selecting the top N pieces of software from the software list corresponding to the user cluster as recommended software, and showing the recommended software.

9. The method according to claim 1, wherein selecting the top N pieces of software from the software list corresponding to the user cluster and recommending the selected top N pieces of software to the specific user comprise:

removing software that the specific user has installed from a list of software to be recommended of the user cluster, and selecting top N pieces of software from remaining software to recommend the selected top N pieces of software to the specific user.

10. A system for processing recommended software, comprising a server, wherein the server comprises:

memory;

one or more processors; and one or more programs stored in the memory and configured for execution by the one or more processors, the one or more programs comprising instructions to:

perform a cluster analysis for at least one user of at least one user client device based on software using information reported by the at least one user client device to determine a software list corresponding to each user cluster;

sort software in the software list according to using condition of the software;

determine a user cluster that is the most relevant to a specific user based on software using information of the specific user; and select top N pieces of software from a software list corresponding to the user cluster to recommend the selected top N pieces of software to the specific user, where N is a predefined value;

wherein the software using information of the specific user comprises: information of software that has been installed and/or information of software that is frequently started on a client device of the specific user; and the one or more programs comprise instructions to:

in a software list corresponding to each user cluster, determine a cluster relevancy degree between each piece of software and the user cluster according to a rank of the software;

determine user clusters to which the respective software that has been installed and/or the respective software that is frequently started on the client device of the specific user belongs according to software lists corresponding to respective user clusters and cluster relevancy degrees of software in the software lists, and determine cluster relevancy degrees between the respective software that has been installed and/or the respective software that is frequently started and the user clusters to which they belong;

add cluster relevancy degrees of software that belongs to a same user cluster to obtain a matching score of the user cluster; and select a user cluster that has a highest matching score to be the user cluster that is the most relevant to the user.

11. The system according to claim 10, wherein the system further comprises a client and the client comprises:
   memory;
   one or more processors; and
   one or more programs stored in the memory and configured for execution by the one or more processors, the one or more programs comprising instructions to:
   collect software using information of a user having a right of reporting data and report the software using information to the server.

12. The system according to claim 10, wherein the software using information reported by the at least one user client device comprises: software information of software that has been installed on the at least one user client device; and
   the one or more programs comprise instructions to:
   count the amount of respective categories of installed software that is reported by respective sample users;
   determine categories of software that has been installed the most by the respective sample users; and
   perform cluster partition for the sample users by using the categories of the software that has been installed the most as similarity to obtain user clusters of different software using features.

13. The system according to claim 10, wherein the one or more programs comprise instructions to:
   collect the number of downloads of the respective software and the number of times of being started and running time of the respective software on the at least one user client device;
   for each piece of software, respectively multiply the number of downloads, the number of times of being started, and running time of the software by corresponding weights, and make a sum to obtain overall running information of the software, the overall running information of the software being the using condition of the software; and
   sort the software in the software list according to overall running information of the software.

14. The system according to claim 10, wherein the one or more programs comprise instructions to:
   allocate a higher weight to a piece of software that is frequently started than a weight allocated to a piece of software that has been installed, add the cluster relevance degrees of the software that belongs to the same user cluster according to software weights, and use a weighted sum as the matching score of the user cluster.

15. The system according to claim 10, wherein
   the specific user is a user who has a right of reporting data; and
   the one or more programs comprise instructions to:
   receive the software using information obtained and uploaded by a client device of the specific user;
   determine the user cluster that is the most relevant to the specific user based on the software using information reported by the client device of the specific user; and
   send the top N pieces of software selected from the software list corresponding to the user cluster to the client device of the specific user.

16. The system according to claim 15, wherein the one or more programs comprise instructions to:
   receive using information of the recommended software from the client device of the specific user;
   determine recommendation information of the recommended software according to the using information of the recommended software; and
   adjust ranks of the recommended software in the software list corresponding to the user cluster according to the recommendation information of the recommended software, raise a rank of recommended software whose recommendation information is larger than a specific threshold, and lower a rank of recommended software whose recommendation information is smaller than the specific threshold.

17. The system according to claim 16, wherein the using information of the recommended software comprises at least one of: the number of installations of the software, time from starting the software to ending the software, and the number of secondary start-ups after the software is installed.

18. The system according to claim 10, wherein the one or more programs comprise instructions to:
   remove software that the specific user has installed from a list of software to be recommended of the user cluster, select top N pieces of software from remaining software, and recommend the selected top N pieces of software to the specific user.

19. A computer readable storage medium, storing one or more programs configured to be executed by a computer system, the one or more programs comprising instructions to:
   perform a cluster analysis for at least one user of at least one user client device based on software using information reported by the at least one user client device to determine a software list corresponding to each user cluster;
   sort software in the software list according to using condition of the software;
   determine a user cluster that is the most relevant to a specific user based on software using information of the specific user; and
   select top N pieces of software from a software list corresponding to the user cluster to recommend the selected top N pieces of software to the specific user, where N is a predefined value;
   wherein the software using information of the specific user comprises: information of software that has been installed and/or information of software that is frequently started on a client device of the specific user; and
   the one or more programs comprise instructions to:
   in a software list corresponding to each user cluster, determine a cluster relevancy degree between each piece of software and the user cluster according to a rank of the software;
   determine user clusters to which the respective software that has been installed and/or the respective software that is frequently started on the client device of the specific user belongs according to software lists corresponding to respective user clusters and cluster relevancy degrees of software in the software lists, and determine cluster relevancy degrees between the respective software that has been installed and/or the respective software that is frequently started and the user clusters to which they belong;
   add cluster relevancy degrees of software that belongs to a same user cluster to obtain a matching score of the user cluster; and select a user cluster that has a highest matching score to be the user cluster that is the most relevant to the user.

\* \* \* \* \*